(12) United States Patent  (10) Patent No.: US 8,308,183 B1
McElhinney, Jr.  (45) Date of Patent: Nov. 13, 2012

(54) BALL MOUNT STORAGE DEVICE

(76) Inventor: Arthur R. McElhinney, Jr., Plum, PA (US)

( * ) Notice: Subject to any disclaimer, the term of this patent is extended or adjusted under 35 U.S.C. 154(b) by 274 days.

(21) Appl. No.: 12/802,542

(22) Filed: Jun. 9, 2010

(51) Int. Cl.
 *B60D 1/14* (2006.01)
(52) U.S. Cl. ..................... 280/491.5; 280/769
(58) Field of Classification Search ............. 280/491.5, 280/504, 507, 762; 224/505–507; 70/19, 70/58
 See application file for complete search history.

(56) References Cited

U.S. PATENT DOCUMENTS

| | | | | |
|---|---|---|---|---|
| 5,794,828 A * | 8/1998 | Colan et al. | .................. | 224/530 |
| 5,890,726 A * | 4/1999 | McCoy et al. | ............ | 280/406.1 |
| 6,070,441 A * | 6/2000 | Bernstrom | ........................ | 70/58 |
| 6,099,015 A * | 8/2000 | Marcy | ............................. | 280/433 |
| 6,125,945 A * | 10/2000 | Skaggs et al. | ................. | 172/439 |
| 6,203,048 B1 * | 3/2001 | Adair | ......................... | 280/491.5 |
| 6,234,512 B1 * | 5/2001 | Bettenhausen | ............ | 280/491.1 |
| 6,412,314 B1 * | 7/2002 | Jenks | ................................ | 70/14 |
| 6,832,709 B2 * | 12/2004 | Henry | ........................... | 224/403 |
| 7,055,844 B1 * | 6/2006 | Bostedt | ..................... | 280/491.5 |
| 7,258,359 B2 * | 8/2007 | Wooten | ..................... | 280/491.5 |
| 7,332,669 B2 * | 2/2008 | Shadd | ............................. | 84/742 |
| 7,661,543 B1 * | 2/2010 | Townsend | ........................ | 211/4 |
| 7,971,896 B2 * | 7/2011 | Hughes et al. | ................ | 280/495 |
| 8,079,611 B2 * | 12/2011 | Schroeder | .................. | 280/491.5 |
| 2003/0057676 A1 * | 3/2003 | Griggs et al. | ................. | 280/504 |
| 2003/0164437 A1 * | 9/2003 | Wilson | .......................... | 248/539 |
| 2003/0184048 A1 * | 10/2003 | Bonde | ........................ | 280/491.5 |
| 2003/0230608 A1 * | 12/2003 | Henry | ........................... | 224/403 |
| 2004/0150189 A1 * | 8/2004 | Deanda | ....................... | 280/491.1 |
| 2006/0220347 A1 * | 10/2006 | Witchey | ........................ | 280/507 |
| 2006/0289580 A1 * | 12/2006 | Faver et al. | .................... | 224/521 |
| 2007/0262563 A1 * | 11/2007 | Williams | ...................... | 280/506 |
| 2008/0224448 A1 * | 9/2008 | Siemantel et al. | ........... | 280/507 |
| 2012/0049484 A1 * | 3/2012 | Brass | ............................. | 280/507 |
| 2012/0098655 A1 * | 4/2012 | Preta et al. | .................... | 340/438 |

\* cited by examiner

*Primary Examiner* — John Walters
*Assistant Examiner* — James Triggs
(74) *Attorney, Agent, or Firm* — R. S. Lombard

(57) ABSTRACT

A ball mount storage device for attachment to a vehicle supporting member. The ball mount storage device for storing a ball mount that engages a vehicle hitch. The ball mount includes a metallic tubular stem connected to a ball retaining portion that carries a ball for towing a trailer. The ball mount storage device includes a mounting bracket for attachment to a vehicle. A ball mount stem receiving pin extends from the bracket and is engageable with apertures carried in the stem of the ball mount. The stem is also provided with an aperture for receiving a ball mount lock. A stem stop wall is attached to the mounting bracket in predetermined position to prevent rotation of the ball mount about the ball mount stem receiving pin. A magnetic means is carried on the stem stop wall to magnetically maintain the ball mount in firm engagement with the stem stop wall until the ball mount is manually removed. A configuration of the ball mount storage device with two mounting brackets is also provided.

15 Claims, 8 Drawing Sheets

BALL MOUNT STORAGE DEVICE

BACKGROUND OF THE INVENTION

This invention relates to a ball mount storage device for attachment to a vehicle, and, in particular to a device to store a ball mount of a ball-type hitch, such as a Reese hitch. The ball mount includes a stem that is removably engageable within a receiver of a hitch attached to a vehicle.

Ball mounts for such hitches are widely used. Retaining the ball mount within the hitch receiver when not towing a trailer presents a significant safety issue. The reason for this is that the ball mount normally extends beyond the vehicle's rear bumper and obviously in a collision circumvents the impact absorbing safety aspects that have been engineered into modern bumper systems. Instead the ball mount is in substantial rigid contact with the vehicle's chassis and therefore in a collision often results in more damage to the vehicle and the vehicle impacting the ball mount than if the ball mount had been removed from the receiver. Also, leaving the ball mount in the receiver without an attached trailer may result in more severe injuries to occupants of both the vehicle carrying the ball mount and the vehicle hitting the ball mount. Studies have been done by the insurance industry and the government suggesting that regulations may develop requiring that ball mounts be removed from the receiver when not in use. The problem then is that a relatively heavy ball mount that is not properly stored in the vehicle may become a dangerous projectile in a collision. A ball mount storage device prevents this from happening.

Various somewhat complex ball mount storage devices have been disclosed in the past. It is an object of the present invention to provide a simple, reliable, versatile and easy to use ball mount storage device.

SUMMARY OF THE INVENTION

The present invention provides a ball mount storage device for mounting on or in a vehicle, such as, a trailer, truck or automobile. Such a ball mount storage device is for storing a ball mount of a receiver type hitch. The ball mount includes a metallic tubular stem have a generally rectangular cross-section and a ball-retaining portion attached to or integral with and extending from one end of the tubular stem. The rectangular tubular stem has a first pair of opposite side walls each having a hitch pin receiving aperture in alignment with one another so as to receive a hitch pin. A ball is attached to the ball retaining portion of the ball mount.

The ball mount storage device of the present invention includes an elongated relatively thin mounting bracket which desirably has mounting bracket apertures near opposite ends of the bracket to permit means for attachment of the storage device to a vehicle or intermediate support that may be attached to a vehicle. Desirably, the mounting bracket is made of metal, such as, an iron alloy, such as, hardened steel. A first ball mount stem receiving pin is attached at a proximal end thereof to the mounting bracket near one of the mounting bracket apertures near one end of the bracket. The first ball mount stem receiving pin extends perpendicularly from the top surface of the mounting bracket. The first stem receiving pin has a ball mount locking aperture passing through it near the distal end of the receiving pin. A stem stop wall is attached to an edge of the elongated mounting bracket at a position preferably offset longitudinally with respect to the bracket from the first stem receiving pin towards the other end of the bracket. The stem stop wall may also be made of a metal such as an iron alloy, such as, hardened steel, or, as described subsequently, may be a permanent magnet. The stem stop wall extends perpendicularly from the top surface of the elongated mounting bracket and in operation of the device contacts the tubular stem of the ball mount near the one end of the stem so as to act as a firm stop for any rotational movement of the ball mount with respect to the first stem receiving pin. A ball mount lock or a portion thereof is sized to pass through the ball mount locking aperture to lock the ball mount to the first stem receiving pin.

Preferably, the ball mount storage device of the present invention also includes a magnetic field means attached to or embedded on or through a first surface of the stem stop wall in restraining magnetic arrangement with the rectangular tubular stem in operation of the device to prevent any rotation of the ball about the first stem receiving pin. The metallic rectangular tubular stem is prevented by the magnetic field of the magnetic field means from rotating about the stem receiving pin until the ball mount is manually removed from the stem receiving pin. The magnetic field means may be a magnetic cushioned tape or tapes with adhesive backing to attach to a first surface of the stem stop wall, whereby the cushioning of the magnetic cushioned tape or tapes inhibits rattling or marring of the rectangular tubular stem while maintaining magnetic contact with the metallic rectangular tubular stem in the operative position. Alternatively, the stem stop wall may be a permanent magnet.

Rather than the inclusion of the magnetic field means, in an alternative embodiment, the ball mount storage device may instead include a first U-shaped retainer attached to an edge of the mounting bracket opposite the stem stop wall. A second U-shaped retainer is attached to a distal edge of the stem stop wall. A first helical metallic spring member is attached at one end to the first U-shaped retainer. A first hook member is attached to the helical spring member at the other end thereof. The first hook member engages the second U-shaped retainer during operation of the device.

The ball mount lock member may include a hitch pin clip or cotter pin sized to pass through the ball mount locking aperture of the first stem receiving pin or the ball mount lock member may include a padlock having a shackle sized to pass through the ball mount locking aperture of the stem receiving pin, for example.

In yet a further embodiment, the ball mount storage device also includes a second elongated mounting bracket. The second mounting bracket may include bracket mounting apertures to assist mounting the bracket to a vehicle as the case for the first mounting bracket. The second mounting bracket apertures are preferably positioned near opposite ends of the bracket. The other components of the second mounting bracket for this embodiment are essentially the same as for the first mounting bracket. With this embodiment the first and second elongated mounting brackets preferably share and are attached to the same stem stop wall positioned between the brackets. With this embodiment the ball mount storage device can hold two ball mounts.

In one version of the two ball mount type storage device, an additional magnetic field means is attached to or embedded on a second surface of the stem stop wall opposite the first surface of the stem stop wall. The second magnetic field means functions like the first magnetic field means by being in restraining magnetic arrangement with the metallic rectangular tubular stem of the second ball mount in operation. In the same manner as the first magnetic field means, the second magnetic field means may include a magnetic tape or tapes attached to the second surface of the stem stop wall. Alternatively, the stem stop wall may be a permanent magnet.

In another version of the described two ball mount storage device use of the same basic arrangement as the single mount storage device with the first helical spring member is made. In this embodiment a second helical spring member is added to restrain the second ball mount. The ball mount storage device of this embodiment includes a second elongated mounting bracket which desirably includes bracket mounting apertures near opposite ends of the second mounting bracket to permit means for attachment of the storage device to a vehicle or intermediate support that may be attached to a vehicle. The other components of the second mounting bracket for this embodiment are essentially the same as for the first mounting bracket. With this embodiment the first and second elongated mounting brackets preferably also share and are attached to the same stem stop wall positioned between the brackets. With this embodiment the ball mount storage device can hold two ball mounts. In this embodiment the ball mount storage device also includes a third U-shaped retainer attached to an edge of the mounting bracket of the second ball mount opposite the stem stop wall. The second helical spring member is attached at one end thereof to the third U-shaped retainer. A second hook member is attached to the second helical spring member at the other end thereof. The second hook member is adapted to engage the second U-shaped retainer in the operative position.

The first and second elongated mounting brackets may be provided with a hump portion. The hump portion includes a stem receiving aperture. The proximal end of the stem receiving pin passes through the stem receiving pin aperture. An attachment means attaches the stem receiving pin near the proximal end thereof to the hump portion of either the first or second mounting brackets. The hump portion merely provides a space under the mounting bracket to house the proximal end of the stem receiving pin and any attachment means. In operation the hump portion serves as a resting surface for the stem of the ball mount. The attachment means may be a weld; or the stem receiving aperture and the proximal end of the stem receiving pin may each be threaded to provide a means for tightening the stem receiving pin in the hump portion; or the proximal end of the stem receiving pin may be threaded and two bolts of corresponding threading may utilized one above the hump portion and one below the hump portion and tightened to lock the pin in place with respect to the hump portion.

BRIEF DESCRIPTION OF THE DRAWINGS

For a better understanding of the particular embodiments of the present invention reference may be made to the following drawings exemplary of the invention, in which.

DETAILED DESCRIPTION OF PARTICULAR EMBODIMENTS

Figure 1:
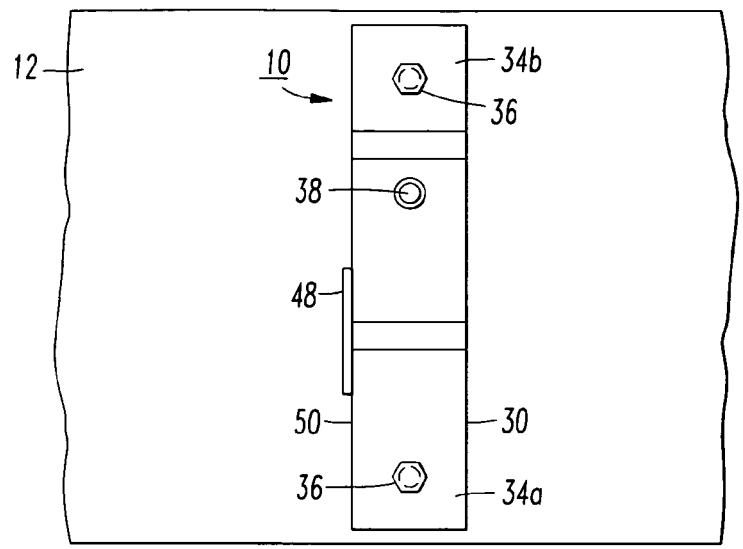
FIG. 1 is a plan view of a ball mount storage device affixed to a supporting member.

As shown in FIG. 1, the present invention provides a ball mount storage device 10 for attachment to a vehicle supporting member 12 by bracket mounting bolts 36, for example. As mentioned the ball mount storage device 10 is for storing a ball mount 14 depicted in phantom in FIGS. 2 and 5 for example. The ball mount 14, is for engaging a hitch, not shown, such as, a Reese hitch. The ball mount 14, as is well known, includes a metallic tubular stem 16, typically made of hardened steel, that is removably engageable with a receiver of a hitch, not shown, mounted to a vehicle.

With reference to FIGS. 1, 2, 5-8, there is shown a ball mount storage device 10 of the present invention mountable on a vehicle, such as, a trailer, truck or automobile. In FIG. 1 the ball mount storage device 10 is depicted mounted to a supporting member 12 of a vehicle which may be, for example, a pick-up truck bed inner wall or floor, or the top or side of a trailer frame. The ball mount storage device 10 may be mounted either vertically or horizontally, by bolts 36 engaging nuts, not shown, attaching device 10 to supporting member 12, alternatively for example, device 10 could be welded to supporting member 12. The ball mount storage device 10 may also be mounted within a cab of a truck or within the interior or trunk of an automobile to the floor or an interior side wall in a similar manner. The metallic tubular stem 16 of the ball mount 14 has a rectangular cross-section sized to be insertable within the receiver of the hitch, not shown, and is typically made of hardened steel. Ball mount 14 also includes a ball retaining portion 18 typically attached by welding to the metallic tubular stem 16 or integral therewith. The ball retaining portion 18 extends from one end 20 of the tubular stem 16. The rectangular tubular stem 16 has a first pair of oppositely disposed side walls 22a, 22b. The stem side walls 22a, 22b each have a hitch pin receiving aperture 24 passing through it near the other end 26 of the stem 16 in operative alignment for receiving a hitch pin, not shown. A ball 28 is attached to the ball retaining portion 18.

With reference to FIGS. 1-8, the ball mount storage device 10 of the present invention includes a metallic mounting bracket 30 having dimensions such as 2½ inches wide, 10 inches long and 3/16 inches thick, for example, and which is preferably made of an iron alloy such as hardened steel. The mounting bracket 30 is preferably provided with mounting bracket apertures 32a, 32b near respective opposite ends 34a, 34b. The bracket mounting bolts 36 may attach the mounting bracket to the supporting member 12 of a vehicle, by passing through the apertures 32a, 32b and engaging nuts, not shown. Of course, as stated, the mounting bolts 36 may be omitted if the mounting bracket 30 is being attached to the support member 12 by welding. The mounting bracket 30 may alternatively be attached to an intermediate bracket which is then attached to the vehicle, not shown.

Figure 2:
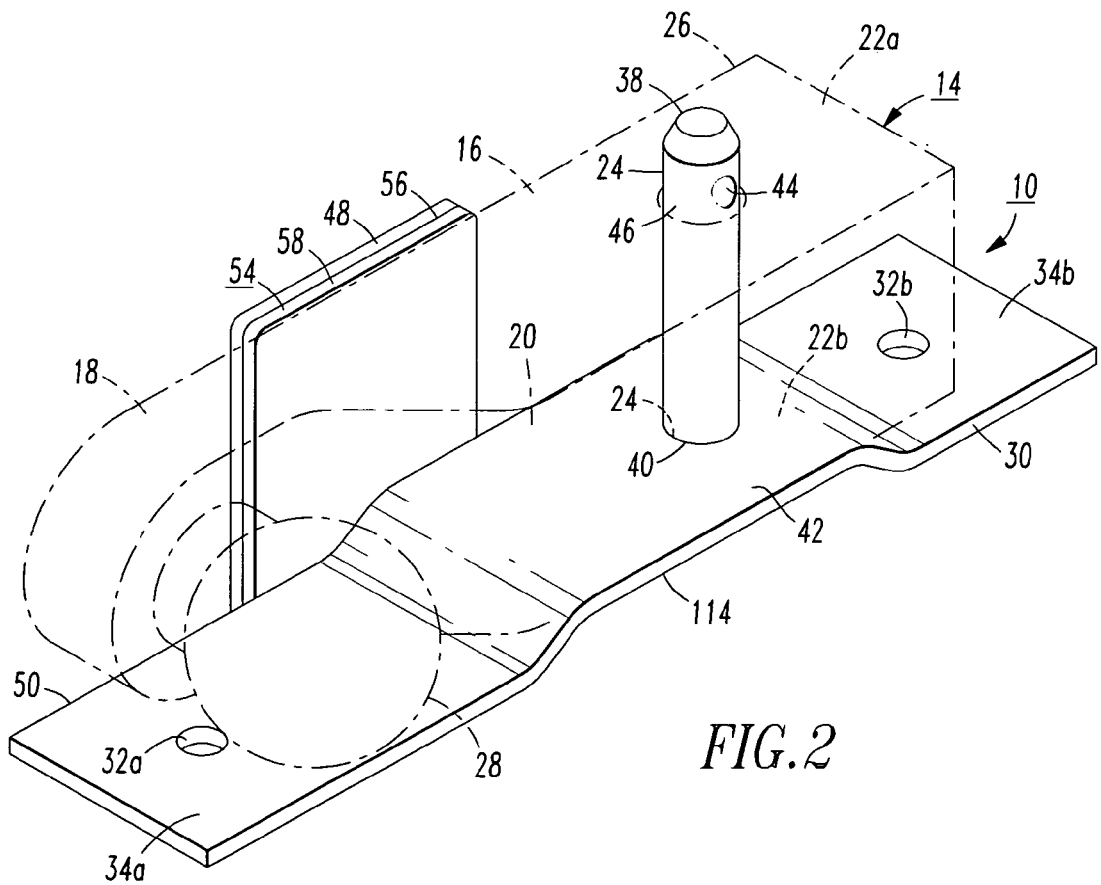
FIG. 2 is a perspective view of a first embodiment of the ball mount storage device of the present invention with the stem stop wall carrying a magnetic field means with a ball mount shown in phantom.
Figure 5:
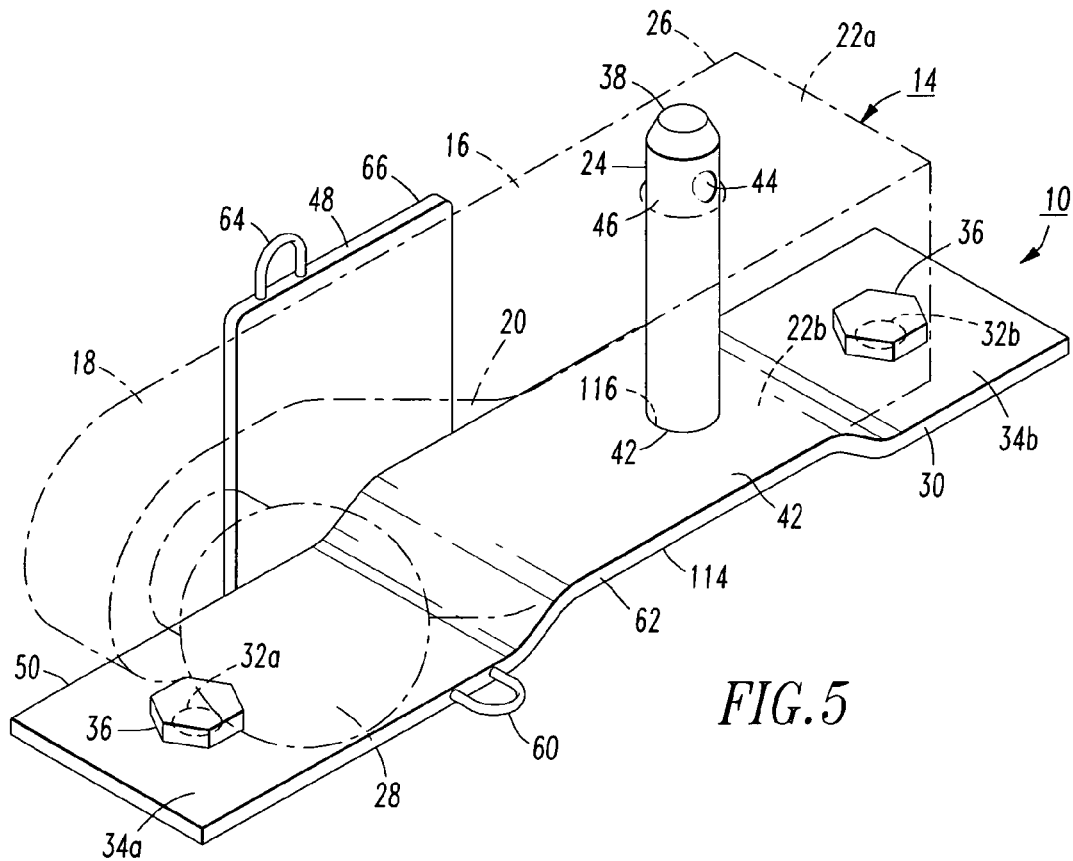
FIG. 5 is a perspective view of a second embodiment of the ball mount storage device of the present invention with first and second U-shaped retainers and the ball mount shown in phantom.
Figure 7:
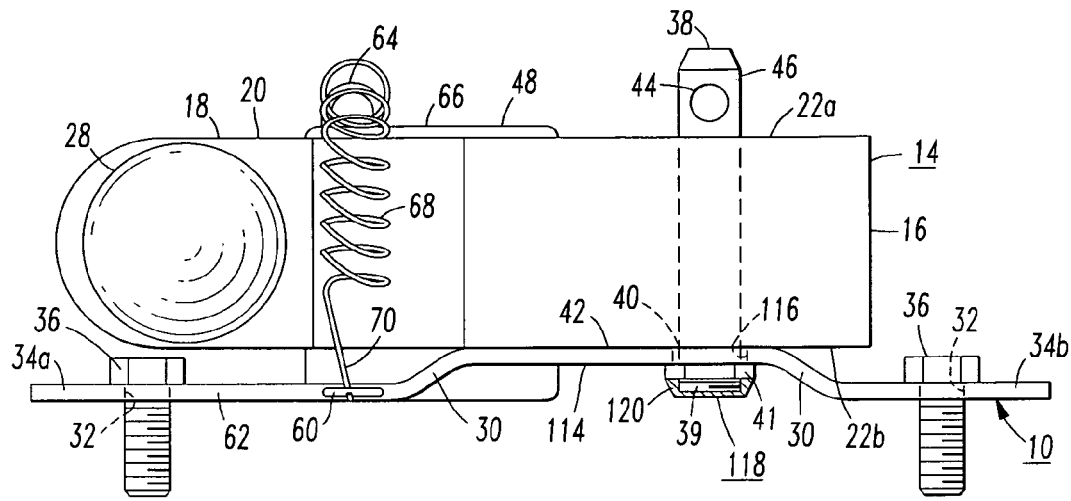
FIG. 7 is a side elevation view of the ball mount storage device shown in FIG. 6.

A first ball mount stem receiving pin 38 is attached at a proximal end 40 to the mounting bracket 30 by engaging stem receiving pin aperture 116 positioned near one of the mounting bracket apertures 32b. In one embodiment, the proximal end 40 pin 38 passes through pin aperture 116 and is provided with threading 39 and attached by a receiving pin nut 41 to the mounting bracket 30. The nut 41 may be welded to bracket 30 such as shown in FIG. 7 by weld 120 near stem receiving pin aperture 116. The first ball mount stem receiving pin 38 extends perpendicularly from and with respect to the top surface 42 of the mounting bracket 30 as shown in FIGS. 2 and 5. The first ball mount stem receiving pin 38 is provided with a ball mount locking aperture 44 passing through it transversely near the distal end 46.

Figure 3:
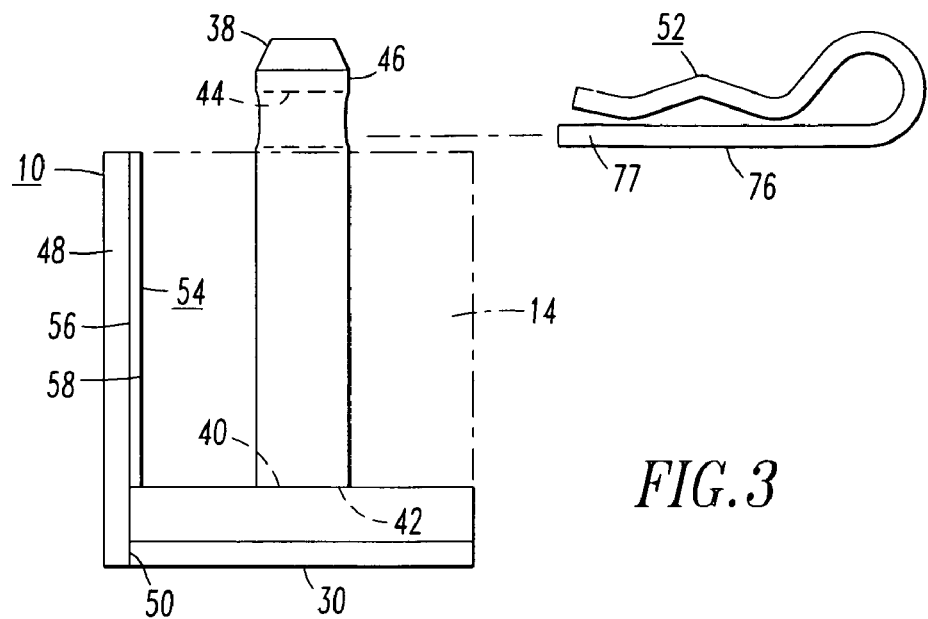
FIG. 3 is a end elevation view of the ball mount storage device shown in FIG. 2 with the ball mount lock member comprising a hitch pin clip positioned do engage the ball mount locking aperture.
Figure 4:
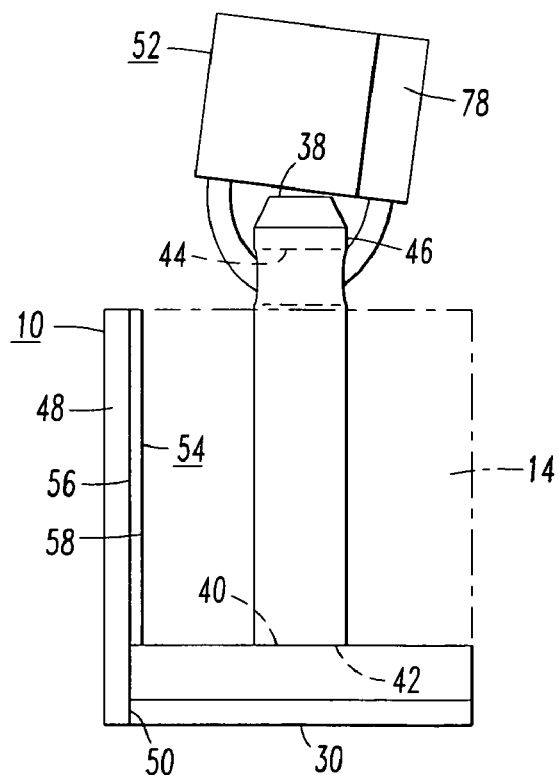
FIG. 4 is the same as FIG. 3 but with a padlock having a shackle engaging the ball mount locking aperture.

A metallic stem stop wall 48 is attached by welding, for example, to the elongated mounting bracket 30 at an edge 50 thereof at a position longitudinally offset from the first ball mount stem receiving pin 38, as shown in FIGS. 2 and 5, for example, near one end 20 of the tubular stem 16. As can be seen in FIGS. 1-8, the stem stop wall 48 extends perpendicularly with respect to the top surface 42 of the mounting bracket 30. The stem stop wall 48 may have dimensions such as 2½ inches wide, 2½ inches high and 3/16 inches thick. The stem stop wall 48 may be comprised of a metal, such as an iron alloy, such as hardened steel, or as described subsequently, may be a permanent magnet. The stem stop wall 48 contacts the tubular stem 16 near one end 20 thereof in operation of the device 10. A ball mount lock member 52 is sized to pass through the ball mount locking aperture 44 and in operation locks the ball mount 14 to the ball mount storage device 10, as shown in FIGS. 3 and 4.

Figure 12:
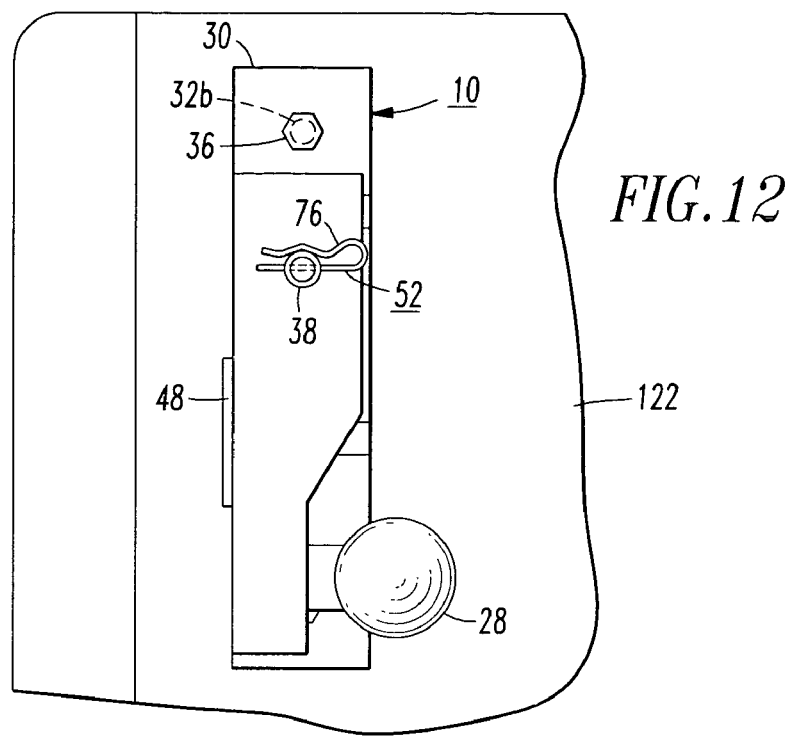
FIG. 12 is a schematic elevation view of a single ball mount version of the present invention with stem stop wall 48 a permanent magnet mounted in position on the inside wall of a pick-up truck bed; and, FIG. 13 is the same as FIG. 12 but showing a double ball mount version of the present invention mounted in position on the inside wall of a pick-up truck bed.

In a preferred embodiment, as shown in FIGS. 2-4, the ball mount storage device 10, further includes a magnetic field means 54 which may be attached to or embedded on or through a first surface 56 of the stem stop wall 48. In operation the magnetic field means 54 is in restraining magnetic arrangement with the metallic stem 16. In one version of the invention, as mentioned, the stem stop wall 48 may be a permanent magnet as shown in FIG. 12. In another version, the magnetic field means 54 may be a magnetic cushioned tape 58 or tapes, such as manufactured and sold by K & J Magnetics, Inc., of 2110 Ashton Drive, Suite 1A, Jamison, Pa. 18929, as item number BYOY04. The magnetic cushioned tape or tapes 58 have an adhesive backing that adheres to the first surface 56 of the stem stop wall 48. The cushioned magnetic tape 58 inhibits rattling or marring of the tubular stem 16 while maintaining magnetic contact with the metallic stem 16 during operation of the device 10 to prevent rotation of the stem 16 about the stem receiving pin 38 until the ball mount 14 is manually removed from the stem receiving pin 38.

Figure 6:
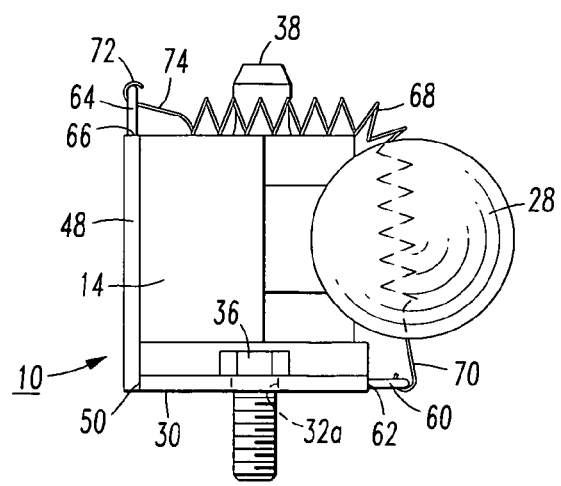
FIG. 6 is an end elevation view of the ball mount storage device shown in FIG. 5 with the first helical spring member attached to the first and second U-shaped retainers.
Figure 8:
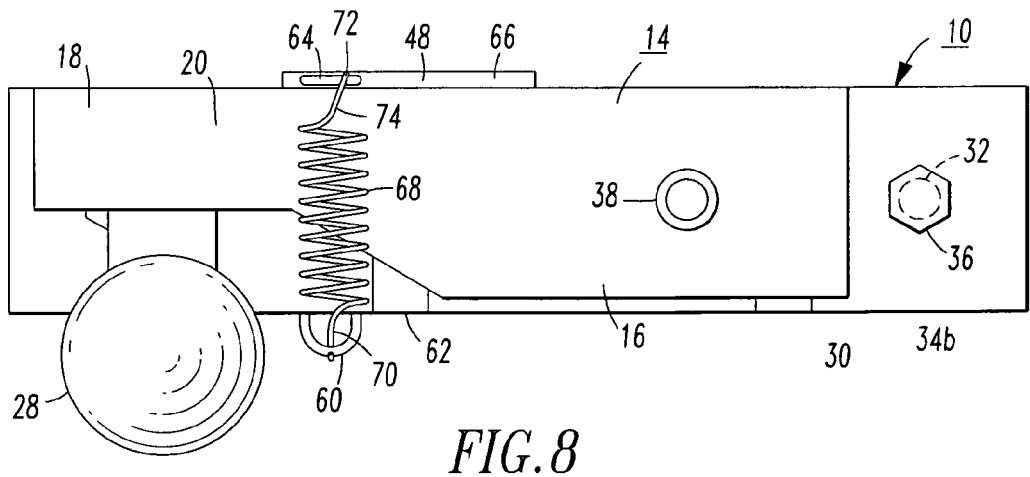
FIG. 8 is a plan view of the ball mount storage device shown in FIG. 6.

In another embodiment, as shown in FIGS. 5-8, the ball mount storage device 10, instead of magnetic field means 54, further includes a first U-shaped retainer 60 attached at an edge 62 of the mounting bracket 30 opposite the stem stop wall 48. A second U-shaped retainer 64 is attached to a distal edge 66 of stem stop wall 48. A first metallic helical spring member 68 is attached at one end 70 to the first U-shaped retainer 60. A first hook member 72 is attached to or integral with the first helical spring member 68 at the other end 74 of spring 68. In operation of the device 10, the ball mount 14 is placed in position over the first ball mount stem receiving pin 38 and helical spring 68 is stretched over the ball mount 14 and first hook member 72 and tautly engages the second U-shaped retainer 64, as shown in FIGS. 6 and 8. Thus, the stem 16 is prevented from rotating about the first ball mount stem receiving pin 38.

The ball mount lock member 52 may be a hitch pin clip 76 having one pin 77 sized to pass through the ball mount locking aperture 44 of the first ball mount stem receiving pin 38, as shown in FIG. 3. Alternatively, the ball mount lock member 52 may be a padlock 78 having a shackle 80 sized to pass through the ball mount locking aperture 44, as shown in FIG. 4, for example.

The elongated mounting bracket 30 may be provided with a hump portion 114 as shown in FIGS. 2 and 7, to house the proximal end of receiving pin 38, receiving pin nut 41, and weld 120 so that the mounting bracket 30 may be mounted flush against support 12, for example. Preferably, the hump portion 114 has the stem receiving pin aperture 116, as shown in FIG. 5. The proximal end 40 of stem receiving pin 38 passes through the stem receiving pin aperture 116. As mentioned, the pin 38 may be provided with threading 39 and passes through mounting bracket 30 via pin aperture 116. The receiving pin nut 41, such as shown in FIG. 7, is tightened to lock pin 38 in place. Alternatively or additionally, as already mentioned, an attachment means 118 such as the weld 120 may attach pin 38 to the bracket 30 as shown in FIG. 7 in addition to nut 41. Also, in another alternative design, the hump portion 114 area of the mounting bracket 30 at the stem receiving pin aperture 116 may be threaded and the proximal end of pin 38 may also be provided with corresponding threading to lock the pin 38 to the hump portion 114, not shown. In this case hump portion 114 could be omitted and the mounting bracket would be longitudinally flat instead of humped in this area.

Figure 9:
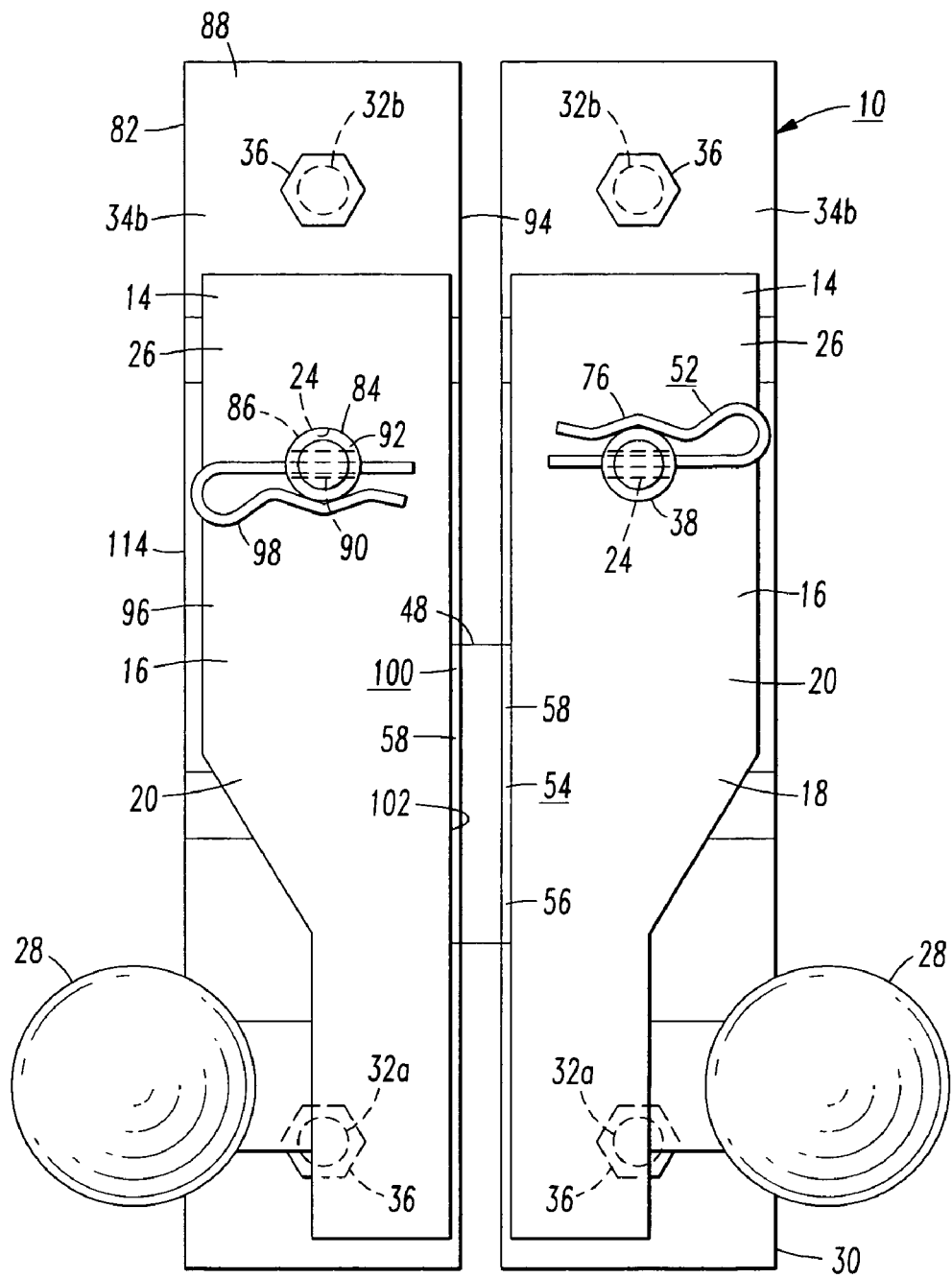
FIG. 9 is plan view of another embodiment of the present invention including a second elongated mounting bracket and the stem stop wall having a magnetic field means on opposite surfaces.
Figure 10:
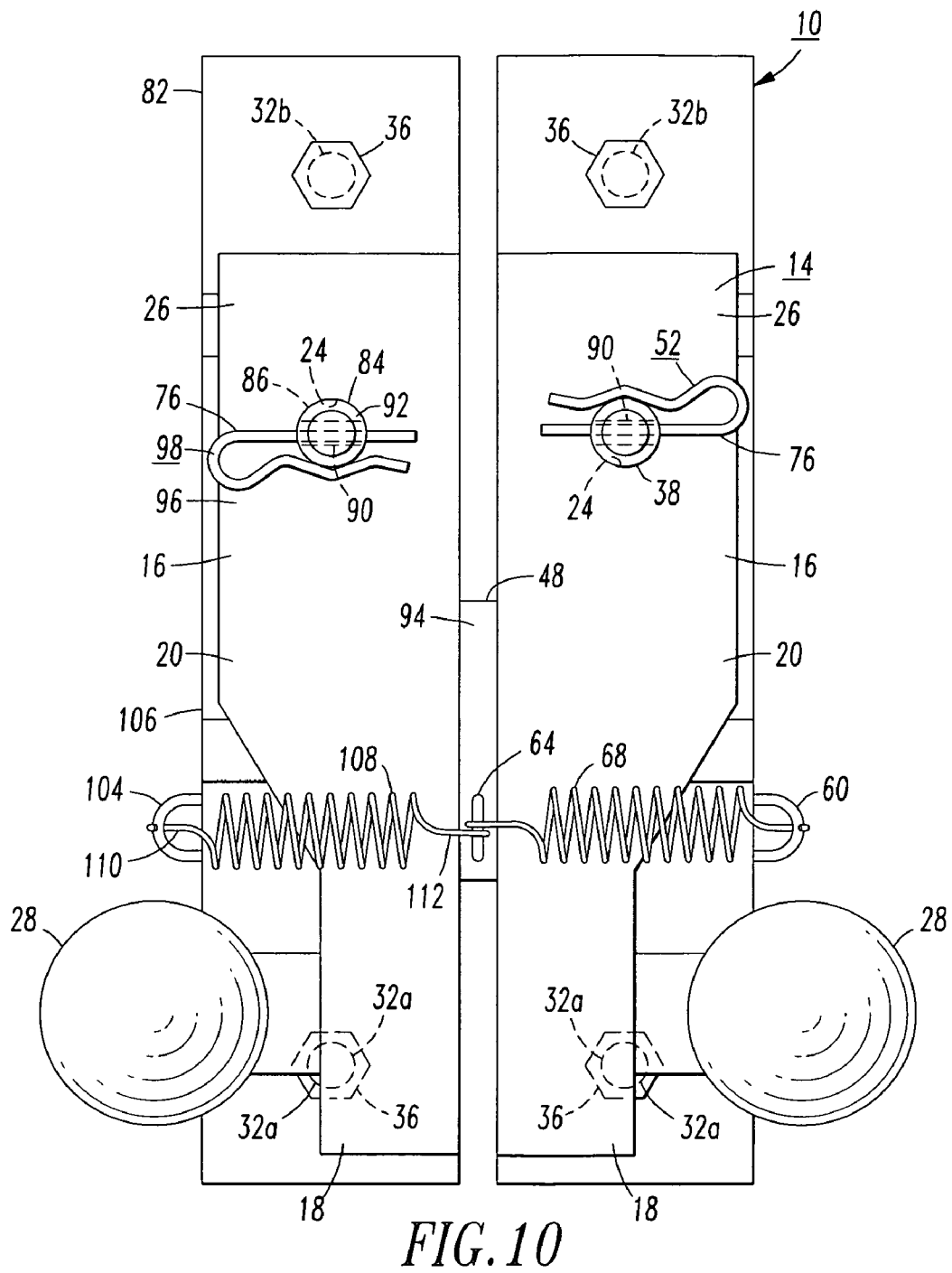
FIG. 10 is plan view of another embodiment of the present invention similar to that as shown of FIG. 9 but having first, second and third U-shaped retainers and first and second helical springs interconnecting the retainers.

With reference to FIGS. 9 and 10, another embodiment of the present invention is shown comprising a second elongated mounting bracket 82 having mounting bracket apertures 32a, 32b which are provided as described for mounting bracket 30. The second mounting bracket 82 may also include a hump portion 114. The second elongated mounting bracket 82 includes a second stem receiving pin 84 attached at a proximal end 86 to the second mounting bracket 82 near one of the mounting bracket apertures 32b and extends perpendicularly from the top surface 88, in the same manner as described for mounting bracket 30. The second stem receiving pin 82 may be attached to the mounting bracket 82 in the same manner as described for the attachment of pin 38 to mounting bracket 30. The second stem receiving pin 84 having a second ball mount locking aperture 90 passing through it near a distal end 92. The stem stop wall 48 is also attached to the second mounting bracket 82 as described for the first mounting bracket 30. That is, the stem stop wall 48 is attached to the second mounting bracket 82 at an edge 94 of the bracket 82 at a position offset longitudinally from the second stem receiving pin 84 as shown in FIG. 9 and near the other of the mounting bracket apertures 32a. Thus, mounting bracket 30 and mounting bracket 82 share the same stem stop wall 48. The stem stop wall 48 extends perpendicularly from the top surface 88 of the second elongated mounting bracket 82. The stem stop wall 48 operatively contacts the tubular stem 16 of a second ball mount 96 near the one end 20. A second ball mount lock 98 is sized to pass through the second ball mount locking aperture 90 and is adapted to lock the ball mount 96 to the second stem receiving pin 84. As described for the first ball mount lock member 52, the second ball mount lock 98 may include hitch pin clip 76 or padlock 78 passing through second ball mount locking aperture 90. In this embodiment the ball mount storage device is adapted to hold two ball mounts which is a desirable configuration because often two ball mounts carrying different size balls are often needed. For example, two ball mounts may be needed if two different size trailers are often transported.

Figure 13:
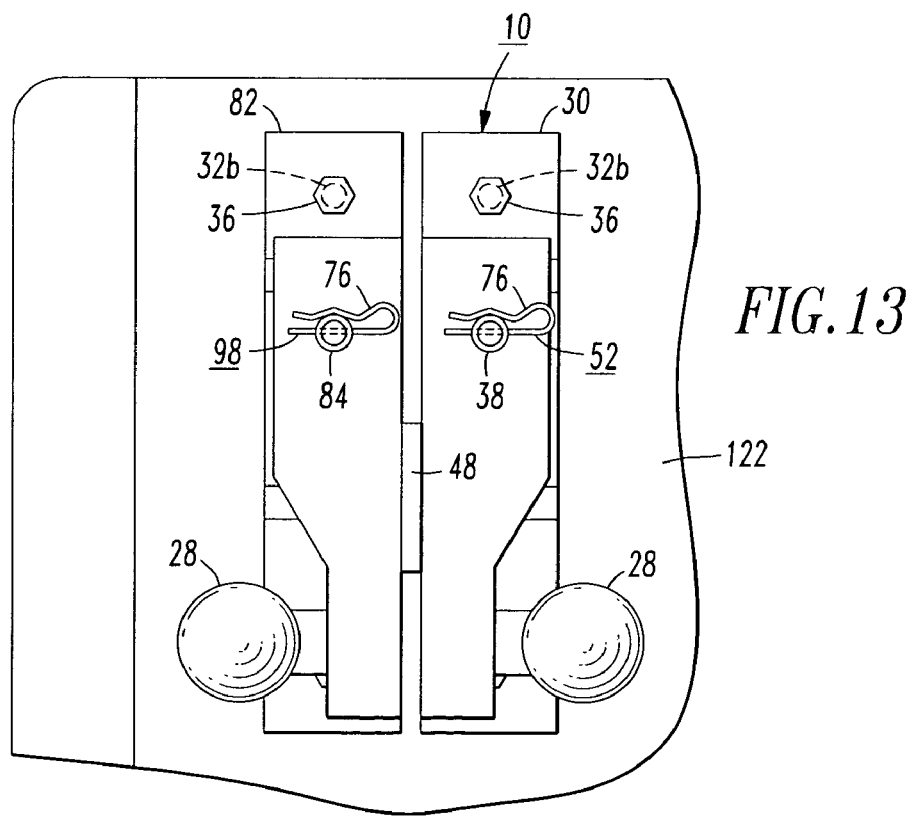

With the ball mount storage device 10 including two mounting brackets 30 and 82, the device 10 may further include a second magnetic field means 100, as with the first magnetic field means 54, which may be attached or embedded on or through a second surface 102 of the stem stop wall 48, opposite the first surface 56 of the stem stop wall 48. As described for the first magnetic field means 54 the magnetic field means 100 may be such that the stem stop wall 48 is made of a permanent magnet as shown in FIG. 13. In another version, the magnetic field means 100 may be a magnetic cushioned tape 58 or tapes as described for the first magnetic field means 54.

In another embodiment, as shown in FIG. 10, which embodiment is basically the same as described for the embodiment shown in FIG. 9, except instead of magnetic field means 54 and 100, it includes a third U-shaped retainer 104 which is attached at an edge 106 of the second mounting bracket 82 opposite the stem stop wall 48. A second helical spring member 108 is attached at one end 110 to the third U-shaped retainer 104. A second hook member 112 is attached to or integral with the second helical spring member 108 and is adapted to engage the second U-shaped retainer 64 in operation of device 10, in the same manner as shown in FIG. 6.

Figure 11:
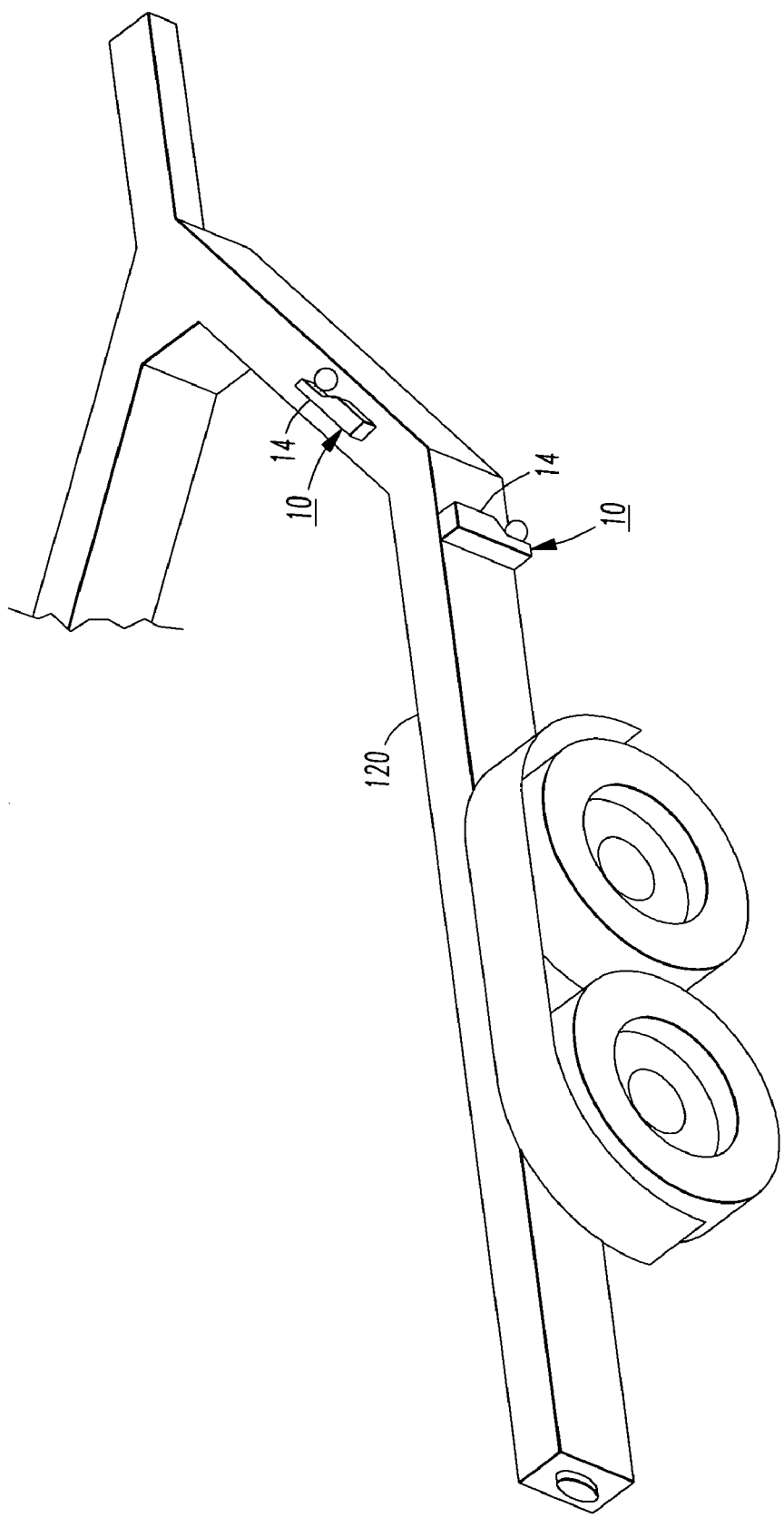
FIG. 11 is a schematic prospective view of a single ball mount version of the present invention attached to a trailer frame shown in both a vertical and horizontal position.

In operation the ball mount 14 of the present invention may be attached in a vertical or horizontal position such as shown in FIG. 11 to a trailer frame 120. FIG. 12 depicts a single mounting bracket 30 configuration attached to the inner wall 122 of a pick-up truck bed or reference may be made to FIG. 13 in which a double mounting bracket 30, 82 configuration is depicted as attached to the inner wall 122 of a pick-up truck bed. If the mounting bracket 30, 82 is mounted in a vertical orientation the ball 28 should be positioned towards the bottom as shown in FIGS. 12 and 13.

What is claimed is:

1. A ball mount storage device mountable on a vehicle for storing a ball mount of a receiver type hitch, said ball mount including a metallic tubular stem having a rectangular cross section and a ball retaining portion affixed to or integral with the tubular stem and extending from one end of the tubular stem, said rectangular tubular stem having a first pair of oppositely disposed side walls, said stem side walls each having a hitch pin receiving aperture passing therethrough proximate the other end of the tubular stem, each of the hitch pin receiving apertures in operative alignment with one another and adapted to receive a hitch pin, a ball affixed to said ball retaining portion, said ball mount storage device comprising:

an elongated mounting bracket having mounting bracket apertures passing therethrough proximate opposite ends thereof, a first ball mount stem receiving pin affixed at a proximal end thereof to said mounting bracket proximate one of said mounting bracket apertures proximate an end of said mounting bracket and extending perpendicularly from the top surface of said mounting bracket, said first ball mount stem receiving pin having a ball mount locking aperture passing therethrough proximate a distal end thereof, a stem stop wall affixed to said elongated mounting bracket proximate an edge thereof at a position offset from said first ball mount stem receiving pin and proximate the one end of said tubular stem in the operative position, said stem stop wall extending perpendicularly from the top surface of said elongated mounting bracket, said stem stop wall adapted to operatively contact said tubular stem of the ball mount proximate said one end of said tubular stem, a ball mount lock member sized to pass through said ball mount locking aperture and adapted to fixedly engage said first stem receiving pin, magnetic field means affixed to or embedded on a first surface of said stem stop wall in restraining magnetic arrangement with said rectangular tubular stem in the operative position, or a first U-shaped retainer affixed to an edge of said mounting bracket opposite said stem stop wall, a second U-shaped retainer affixed to a distal edge of said stem stop wall, a first helical spring member attached at one end thereof to said first U-shaped retainer, a first hook member affixed to said helical spring member at the other end thereof, said first hook member adapted to engage said second U-shaped retainer in the operative position.

2. The ball mount storage device of claim 1, wherein said magnetic field means comprises a magnetic cushioned tape or tapes adhered to the first surface of the stem stop wall, whereby the cushioning of the magnetic cushioned tape or tapes inhibits rattling or marring of the rectangular tubular stem while maintaining magnetic contact with said metallic rectangular tubular stem in the operative position.

3. The ball mount storage device of claim 1, wherein said ball mount lock member comprises a hitch pin clip sized to pass through said ball mount locking aperture of said first stem receiving pin.

4. The ball mount storage device of claim 1, wherein said ball mount lock member comprises a padlock having a shackle sized to pass through said ball mount locking aperture of said first stem receiving pin.

5. The ball mount storage device of claim 1, further comprising a second elongated mounting bracket having mounting bracket apertures passing therethrough proximate opposite ends thereof, said second elongated mounting bracket including a second stem receiving pin affixed at a proximal end thereof to the second mounting bracket proximate one of said mounting bracket apertures and extending perpendicularly from the top surface of said second mounting bracket, said second stem receiving pin having a second ball mount locking aperture therethrough proximate a distal end thereof, said stem stop wall affixed to said second mounting bracket proximate an edge thereof at a position offset from said second stem receiving pin and proximate the other of said mounting bracket apertures, said stem stop wall extending perpendicularly from the top surface of said second elongated mounting bracket, said stem stop wall adapted to operatively contact said tubular stem of a second ball mount proximate the other end thereof, a second ball mount lock sized to pass through said second ball mount locking aperture of said second ball mount and adapted to fixedly engage said second stem receiving pin of said second ball mount, whereby the ball mount storage device is adapted to hold two ball mounts.

6. The ball mount storage device of claim 5, wherein said magnetic field means affixed to or embedded on a second surface of said stem stop wall opposite said first surface of said stem stop wall, said magnetic field means in restraining magnetic arrangement with said metallic rectangular tubular stem of said second ball mount in the operative position, whereby said metallic rectangular tubular stem of said second ball mount is prevented by the magnetic field of the magnetic field means from rotating about said second stem receiving pin until the second ball mount is manually removed from the second stem receiving pin.

7. The ball mount storage device of claim 6, wherein said magnetic field means comprises the magnetic cushioned tape or tapes adhered to the second surface of the stem stop wall, whereby the cushioning of the magnetic cushioned tape or tapes inhibits rattling or marring of the rectangular tubular stem while maintaining magnetic contact with said metallic rectangular tubular stem in the operative position.

8. The ball mount storage device of claim 1, further comprising a second elongated mounting bracket having mounting bracket apertures passing therethrough proximate opposite ends thereof, said second elongated mounting bracket including a second stem receiving pin affixed at a proximal end thereof to the mounting bracket proximate one of said bracket mounting apertures and extending perpendicularly from the top surface of said second mounting bracket, said second stem receiving pin having a ball mount locking aperture passing therethrough proximate the distal end thereof, said stem stop wall affixed to said second mounting bracket proximate an edge thereof at a position offset from said second stem receiving pin and proximate the other of said mounting bracket apertures, said stem stop wall extending perpendicularly from the top surface of said second elongated mounting bracket, said stem stop wall adapted to operatively contact said tubular stem of a second ball mount proximate the other end thereof, a second ball mount lock member sized to pass through said ball mount locking aperture of said second stem receiving pin and adapted to fixedly engage said second stem receiving pin of said second ball mount, whereby the ball mount storage device is adapted to hold two ball mounts.

9. The ball mount storage device of claim 8, further comprising a third U-shaped retainer affixed to an edge of said mounting bracket of said second ball mount opposite said stem stop wall, a second helical spring member attached at one end thereof to said third U-shaped retainer, a second hook member affixed to said second helical spring member at the other end thereof, said second hook member adapted to engage said second U-shaped retainer in the operative position.

10. The ball mount storage device of claim 5, wherein said second ball mount lock member comprises a hitch pin clip sized to pass through said ball mount locking aperture of said second stem receiving pin.

11. The ball mount storage device of claim 5, wherein said second ball lock member of said second ball mount comprises a padlock having a shackle sized to pass through said ball mount locking aperture of said second stem receiving pin.

12. The ball mount storage device of claim 1, wherein said elongated mounting bracket has a hump portion, said hump portion has a stem receiving pin aperture passing therethrough, the proximal end of the stem receiving pin passing through said stem receiving pin aperture, an attachment means operatively attaching said stem receiving pin proximate the proximal end thereof to said hump portion of said elongated mounting bracket.

13. The ball mount storage device of claim 12, wherein said attachment means is a weld.

14. The ball mount storage device of claim 12, wherein said attachment means comprises said stem receiving pin including first threading at the proximal end, said proximal end of said stem receiving pin passing through said pin receiving aperture, a threaded nut in operative engagement with the first threading of the stem receiving pin.

15. The ball mount storage device of claim 12, wherein said attachment means comprises said stem receiving pin including first threading at the proximal end thereof, said hump portion carrying second threading proximate the pin receiving aperture in operative engagement with said first threading of said stem receiving pin.

* * * * *